Oct. 24, 1967  P. C. TREXLER  3,348,890
ISOLATOR METHOD AND APPARATUS
Filed Aug. 27, 1964  4 Sheets-Sheet 2

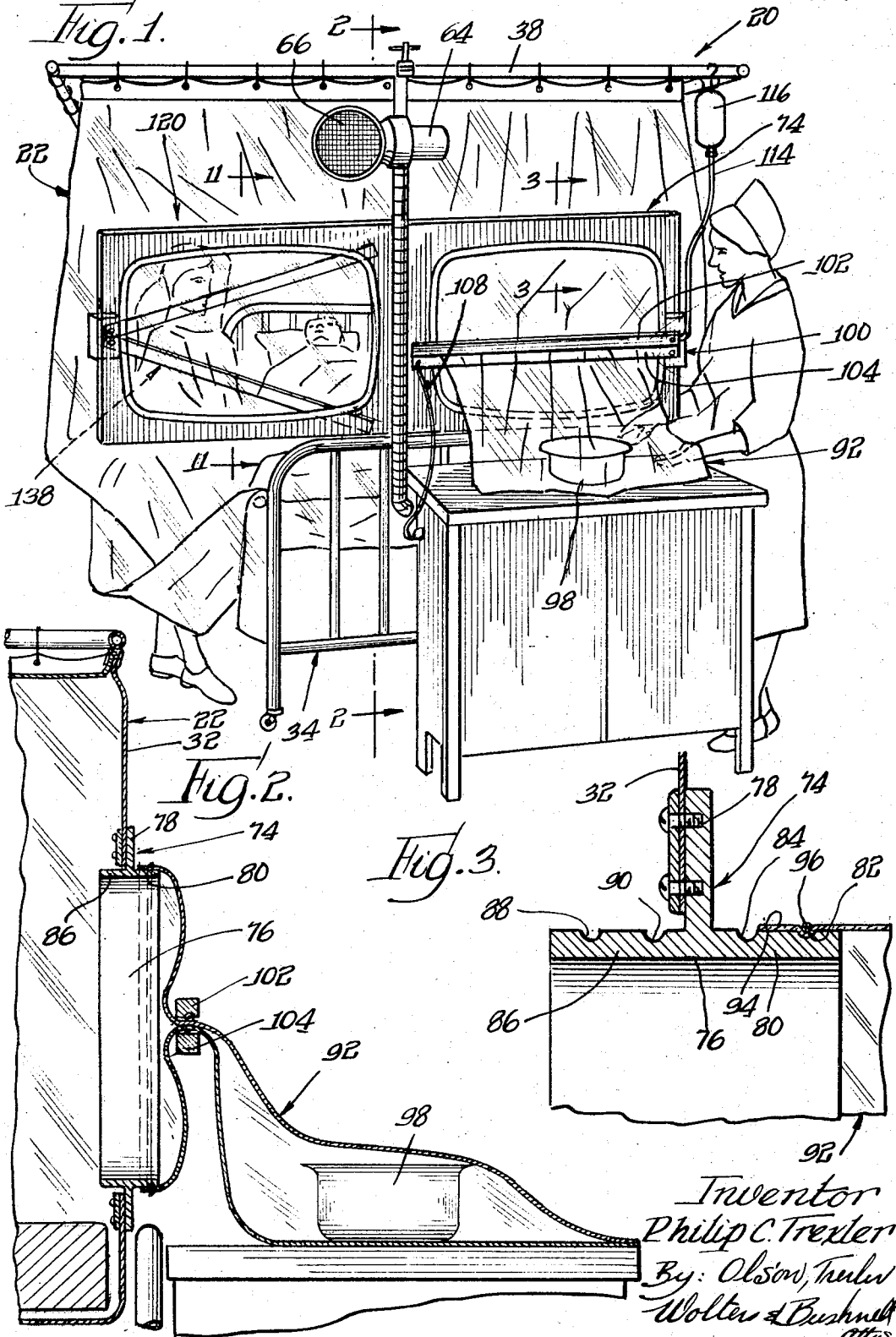

Inventor
Philip C. Trexler
By Olson, Trexler, Wolters & Bushnell
attys.

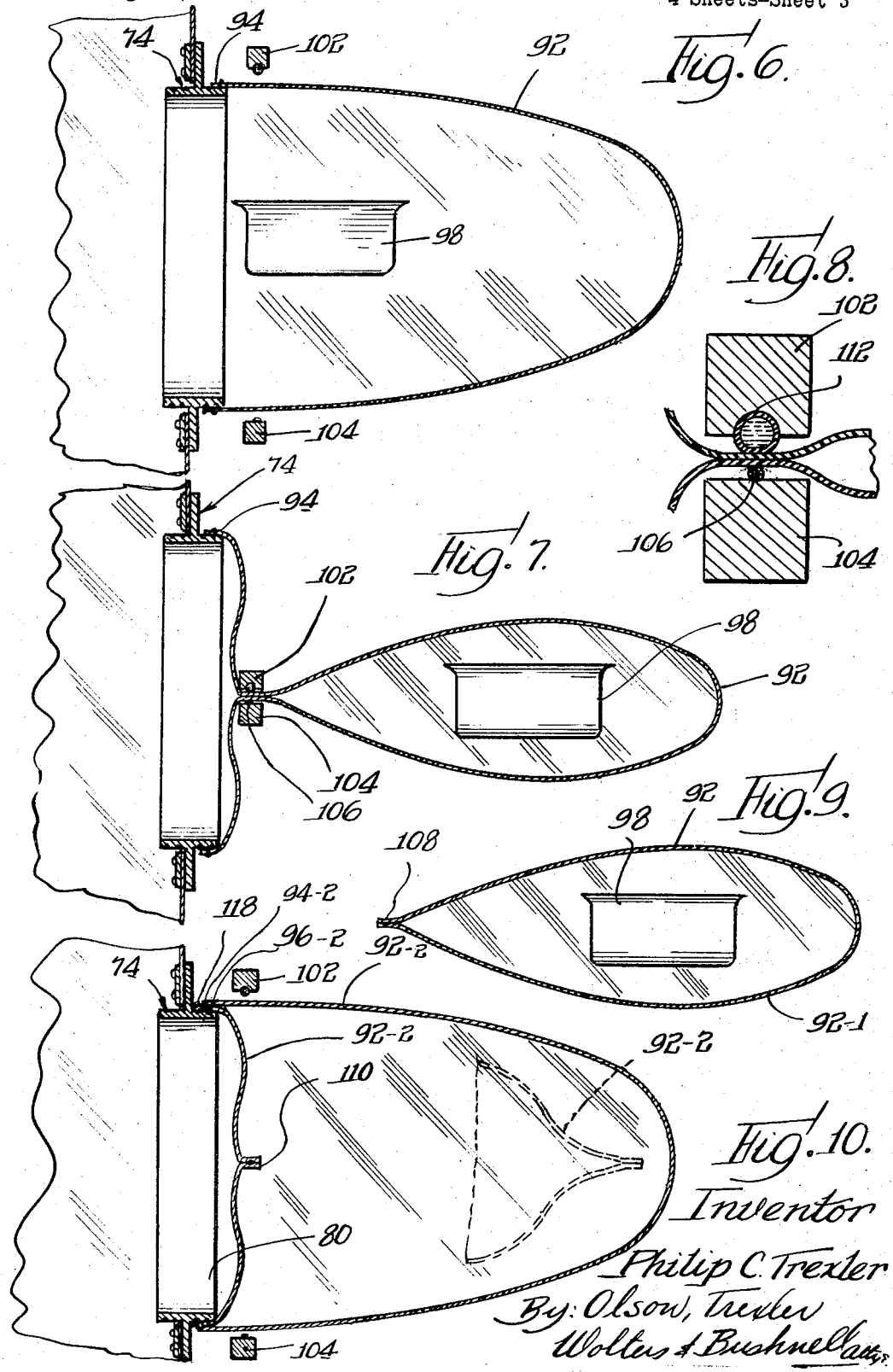

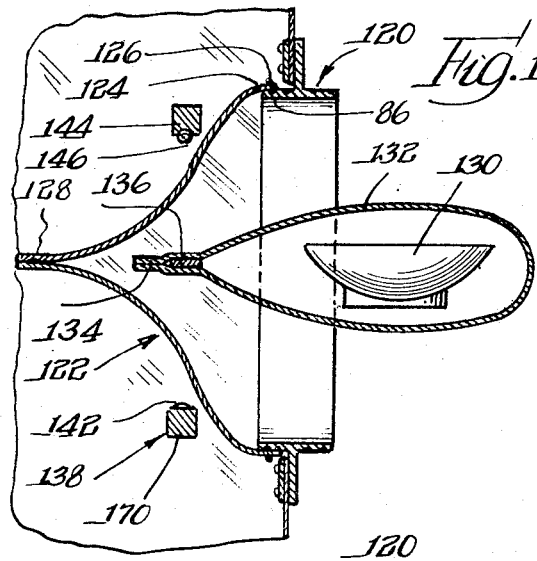

United States Patent Office 3,348,890
Patented Oct. 24, 1967

3,348,890
ISOLATOR METHOD AND APPARATUS
Philip C. Trexler, Stoneham, Mass., assignor to Snyder Manufacturing Company, Inc., New Philadelphia, Ohio, a corporation of Ohio
Filed Aug. 27, 1964, Ser. No. 392,390
10 Claims. (Cl. 312—3)

ABSTRACT OF THE DISCLOSURE

An isolator structure in which sanitary transfer of articles in and out thereof is effected by heat sealing and severing an intermediate portion of a heat sealable plastic film.

The present invention relates to isolating methods and equipment, and more specifically to a novel method and apparatus for isolating adjacent areas from each other and permitting communication between the areas while preventing contaminants in one area from entering the other.

While it will become apparent that various features of the invention may be adapted for use in a variety of medical, biological or industrial situations, the disclosure of the present invention will be facilitated by showing and describing herein an embodiment especially suitable for use in hospitals. It has long been recognized that there are many situations in which it is desirable completely to isolate a patient from contaminants that are always present in a hospital and conversely, there are many situations in which it is desirable to isolate the hospital from a patient. Various proposals have heretofore been made for accomplishing such isolation, and while certain of such proposals have represented advances in art, difficulties have been encountered in obtaining economically and operationally feasible means for accomplishing the desired isolation and for permitting communication between areas from each other without an exchange of contaminants between the areas.

It is an important object of the present invention to provide a novel method and means for isolating adjacent areas from each other and permitting communication between such areas, which method and means are highly effective and relatively simple and economical to use.

A further important object of the present invention is to provide novel isolating means usable in association with a hospital bed or the like and constructed for enabling a patient, food, medicine and other materials to be placed within or removed from the isolator means while selectively preventing contaminants from either entering the isolator means or from escaping from the isolator means in an uncontrolled manner.

A further important object of the present invention is to provide a novel isolator means of the above-described type which is constructed for enabling a doctor, nurse, or other person to administer to the needs of the patient relatively easily and without undue interference from the isolator means and without entering within the isolator means.

A more specific object of the present invention is to provide a novel isolator means of the above-described type which is constructed in a manner for enabling any desired item to be removed from the interior of the isolator means in a manner such that the isolator means is continuously sealed and so that the removed item is continuously enclosed in a sealed package having an exterior surface completely free of any of the contaminants which may be present within the isolator means.

Still another important object of the present invention is to provide a novel isolator means of the above-described type which is constructed for enabling any desired item to be introduced into the interior of the isolator means from an internally sterilized package or container while continuously maintaining the isolator means and interior of the package or container sealed from the surrounding atmosphere.

A still more specific object of the present invention is to provide a novel isolator means utilizing bags or envelopes connectable with a main enclosure portion of the isolator means and adapted to be severed and simultaneously sealed for insuring continuous sealing of the isolator means from the surrounding atmosphere and, when desired, for insuring continuous sealing of all portions of the bag or envelope from the surrounding atmosphere.

Still another specific object of the present invention is to provide a novel isolator means having a main enclosure portion formed from plastic or other suitable clear material for enabling a patient to be observed and adapted to fit over a bed mattress in a manner for promoting comfort to the patient while separating the mattress from the interior of the isolator means.

Other objects and advantages of the present invention will become apparent from the following description and the accompanying drawings wherein:

FIG. 1 is a perspective view showing isolator means incorporating features of the present invention associated with a hospital bed;

FIG. 2 is an enlarged fragmentary sectional view taken generally along lines 2—2 in FIG. 1;

FIG. 3 is an enlarged fragmentary sectional view taken generally along line 3—3 in FIG. 1 and showing a portion of the structure in greater detail;

FIG. 6 is a sectional view taken generally along the same line as FIG. 3 and showing an initial step in the process of removing an item from the interior of the isolator means;

FIG. 7 is a sectional view similar to FIG. 6 but shows a successive step in the removal of an item from the interior of the isolator means and more specifically shows a step of heat sealing and severing a removal bag or envelope;

FIG. 8 is an enlarged fragmentary sectional view showing the heat sealing and severing means in the position of FIG. 7 in greater detail;

FIG. 9 is a sectional view showing the aforementioned item completely removed from the isolator means and sealed within a portion of the bag or envelope;

FIG. 10 is a sectional view similar to FIG. 6 but shows the manner in which a new bag or envelope is assembled over the previous bag or envelope for permitting the removal of subsequent items from the interior of the isolator means;

FIG. 11 is a sectional view taken generally along line 11—11 in FIG. 1 and further shows an initial step in a process of introducing an item from a sealed envelope or bag into the interior of the isolator means;

FIGS. 12, 13, and 14 are sectional views similar to FIG. 11 and show successive steps in the process of introducing the item into the interior of the isolator means; and FIG. 15 is a sectional view similar to FIG. 11 and shows the manner in which an additional severable member cooperable with a sealed bag or envelope may be positioned over a previously severed member for enabling the previously severed member and the empty bag or envelope to be removed and for adapting the isolator means for receiving an additional item from another sealed bag or envelope.

Figure 4:
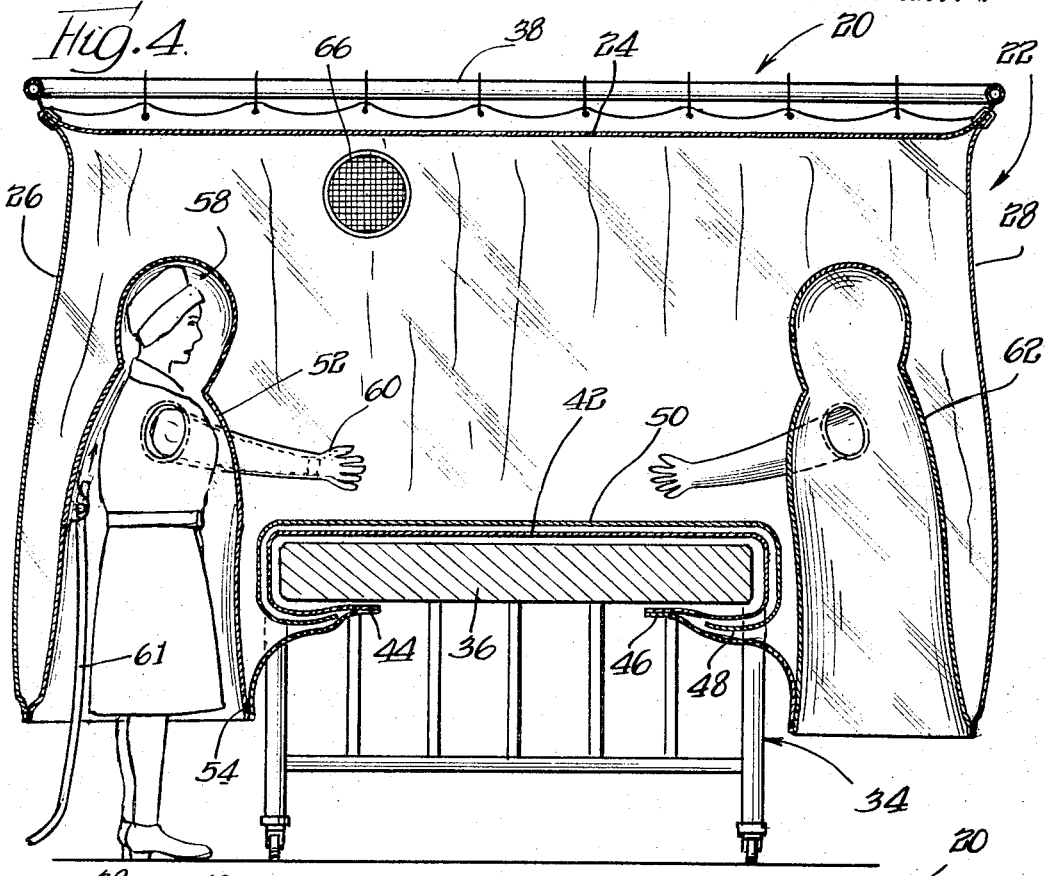
FIG. 4 is a partial sectional view taken generally along line 4—4 in FIG. 5.
Figure 5:
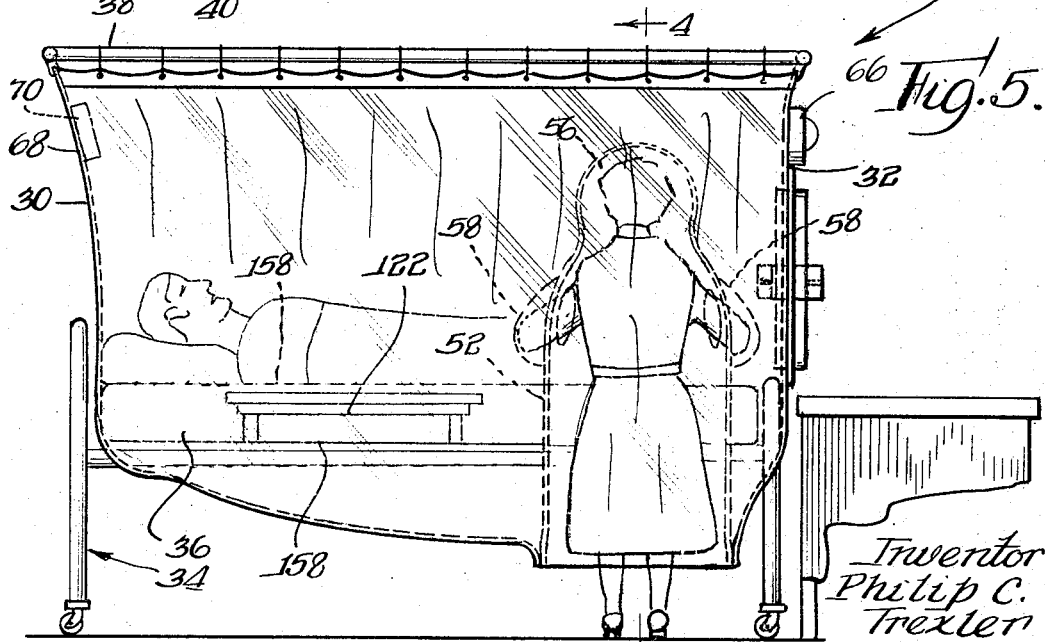
FIG. 5 is a side elevational view showing isolator means incorporating features of the present invention.

Referring now more specifically to the drawings wherein like parts are designated by the same numerals throughout the various figures, an isolator means 20 incorporating features of the present invention is shown in FIGS. 1, 4 and 5 and comprises a main enclosure 22. The enclosure 22 is a bag-like structure having a top 24, opposite sides 26 and 28 and opposite ends 30 and 32 preferably formed from a clear flexible but tough and tear-resistant plastic material such as vinyl. The top, sides and ends are integrally joined or sealed with respect to each other.

The enclosure 22 is adapted to be associated with a bed 34 having a mattress 36 thereon. Various means may be provided for supporting the enclosure 22 and in the embodiment shown, a rectangular frame 38 is supported above the bed 34 and hooks or rings 40 serve to hang the enclosure 22 from the frame 38.

The enclosure 22 has a bottom panel 42 which is sealed to the sides 26 and 28 at 44 and 46 as shown in FIG. 4 and is also sealed in substantially the same manner to the end panels 30 and 32. In order to enhance the comfort of the patient the bottom panel 42 is constructed from a resilient stretchable material such as polyurethane so that it may be stretched in a taut, wrinkle-free manner across the top of the mattress. Preferably the bottom panel 42 is constructed so that marginal portions thereof along both sides and ends of the mattress extend around the edges of the mattress and substantially beneath the mattress as shown in FIG. 4 for providing V-shaped spaces 48 of substantial depth between the bottom panel 42 and the adjacent side and end panels of the enclosure for accommodating marginal portions of a bedsheet 50. In other words, the marginal portions of the bedsheet may be tucked securely beneath the mattress. While the bottom panel 42 and the bedsheet 50 are shown spaced from each other and from the mattress in FIG. 4, it will be appreciated that this has been done merely as an illustration of the structure herein and that in an actual installation, the bottom panel 42 and bedsheet 50 would be stretched tightly against each other and the mattress.

In order to enable a doctor or nurse to administer to the needs of a patient within the enclosure 22, a coat or jacket 52 having an opened bottom extends within the side panel 26 and is sealed as at 54 entirely around a suitable opening formed in the panel 26 for receiving the jacket. The jacket or coat 52 is formed from a flexible transparent plastic material which may be a vinyl material and the same material as the side panel 26 of the enclosure. The jacket is formed with a hood portion 56 and with arm portions 58. The arm portions are provided with hand accommodating glove section 60 for permitting the doctor or nurse more effectively to administer to the patient. Preferably, a hose 61 extends into the jacket 52 for supplying air thereto. If desired, a similar jacket or coat 62 may be connected in the side panel 28 at the opposite side of the enclosure.

It is contemplated that the enclosure 22 will be hermetically sealed from the surrounding atmosphere and therefore means is provided for circulating sterile and fresh air into and from the enclosure. In this connection a blower 64 is mounted on the exterior of the enclosure for forcing air through a filter 66 mounted in an opening formed in the enclosure. A suitable outlet 68 is also provided in the enclosure and a trap or filter 70 is assembled in the outlet. The filters or traps 66 and 70 may be of known construction and need not be described in detail and it suffices to state that they are effective for preventing undesirable contaminants from either entering into or escaping from the interior of the enclosure.

As previously indicated, the present invention contemplates a method and means whereby any desired article or waste material may be removed from the interior of the enclosure 22 while maintaining the enclosure in a sealed condition and in a manner for preventing any contaminants carried with the article or waste material from being spread outside of the enclosure. The method and means are shown in FIGS. 1–3 and 6–10. More specifically a rigid self-supporting port member 74 defines an opening 76 through one of the sides or ends of the enclosure 22. In the embodiment shown, the port member 74 has a radially extending body 78 which is clamped or otherwise sealed to the end panel 32 of the enclosure. In addition the port member comprises an axially outwardly extending annular flange 80 having axially spaced annular grooves 82 and 84 in an outer side thereof for the purposes described below. If desired, the port member may also be provided with an axially inwardly extending flange 86 substantially identical to the flange 80 and also having outwardly facing axially spaced annular grooves 88 and 90 therein.

In order to seal the opening 76, the enclosure means is provided with a bag or envelope 92, which bag is enclosed and sealed except for an open end or mouth portion 94 thereof which extends around the axially outwardly projecting flange 80 of the port member. An elastic band 96 extends around the end portion 94 of the bag and registers with one of the grooves 82 and 84 for releasably clamping and sealing the bag to the port member flange 80.

When it is desired to remove an article such as a pan 98 from the interior of the enclosure means, the pan is passed outwardly through the opening 76 by a nurse or other person in attendance and is positioned within the bag or envelope 92 as shown in FIGS. 1, 2 and 6. Then an intermediate portion of the bag is severed and sealed as shown in FIGS. 7 and 8. Preferably the bag 92 is of a sealable plastic material, and means 100 is mounted in association with the enclosure for sealing and severing the bag. In the embodiment shown, the heat sealing means 100 comprises upper and lower bars 102 and 104 pivotally or other wise mounted for movement between the opened position shown in FIG. 6 and the closed position shown in FIGS. 7 and 8. One of the bars carries a suitably coated electrical resistance wire 106 connectable with a source of electric power by a cord 108 shown in FIG. 1. It will be observed that when the bars 102 and 104 are moved from the opened position shown in FIG. 6 to the closed position shown in FIGS. 1, 7 and 8, an intermediate portion of the bag 92 is pinched therebetween and against the heating wire element 106. This causes the opposite sides of the bag to be heated and sealed together and at the same time severed. As a result an outer portion 92–1 of the bag 92 is sealed as at 108 to provide a closed package containing the pan 98 and an inner portion 92–2 of the bag is sealed as at 110 so that the enclosure remains in a continuously sealed condition.

In order to insure the promotion of satisfactory and uniform seals 108 and 110, a flexible tube 112 filled with liquid is mounted on the underside of the bar 102 for applying uniform hydraulic clamping pressure entirely across the bag. The tube 112 is connected with a tube 114 shown in FIG. 1 which in turn is connected with a bottle or container 116 filled with water. As shown in FIG. 1, the bottle is in an elevated position suspended from the frame 38 so that a substantial hydraulic head is applied to the liquid within the pressure tube 112 for accomplishing the sealing operation. When it is desired to relieve the pressure, it is merely necessary to manually reposition the bottle 116 at a lower elevation. It is also to be noted that the water filled tube 112 not only serves to apply pressure uniformly to the area of the bag being sealed, but also acts as means for absorbing the heat so as to promote more rapid cooling of the seals after the heating element 106 is deenergized.

After the outer end portion 92–1 of the bag 92 has been removed as shown in FIG. 9, it is apparent that the remaining stub portion 92–2 of the bag is no longer suitable for permitting additional articles to be removed from the enclosure means. Thus it is contemplated that the enclosure means comprises a supply of additional bags 92a which may be assembled with the port member 14 over a previously used bag stub 92–2 in the manner shown in FIG. 10. More specifically, the remaining stub portion 92–2 of the bag 92 is positioned so as to have the end thereof clamped in the outer notch 82 of the adapter flange 80. When the end portion 96a of the bag 90a is assembled over the stub portion 92–2, a second elastic band 18 is applied so as to clamp the end of the bag 92a within the innermost groove 84 on the flange 80. After this has been accomplished the nurse or other person in attendance grasps the remaining stub portion 92–2 of the inner bag 92 and pulls it from the flange 80 and into an outer end portion of the bag 92a as shown in dotted lines in FIG. 10. It is understood that the flexible character of the bag 92a permits the nurse to grasp the inner bag stub 92–2 through the outer bag 92a.

When the stub portion of the inner bag has been removed, the above-described process for removing articles from the interior of the enclosure means may be repeated. It is, of course, understood that the articles which are sealed in the outer portions of the bag as shown in FIG. 9 may be carried to any desired location for further processing.

In the embodiment shown, the enclosure means 22 includes a second access port member 120 which is identical to the previously identified port member 74 as indicated by the application of identical reference numerals to corresponding elements thereof in FIGS. 11 through 15. The port 120 is used in the manner described below for introducing items into the enclosure means. However, the structure of the port members 74 and 120 is such that either or both of the port members may be selectively used for either introducing material into or removing material from the enclosure means.

In order to seal the opening defined by the inlet port 120, a tubular bag-like member 122 is positioned with a marginal end portion 124 thereof telescoped over the inwardly projecting flange 86 of the port member. An elastic band 126 encircles the end portion 124 of the bag-like element and clamps it in a groove 88 formed around the flange 86. The opposite end of the bag-like element 122 is closed and it is preferably provided with a V-shaped end seam 128.

In order to introduce the desired article 130 into the enclosure means as shown in FIGS. 11 through 15, the article is first enclosed in a bag 132 having a generally V-shaped end seam 134. It is contemplated that the article 130 and the interior of the bag 132 will be sterilized or otherwise decontaminated so as to prevent the transfer of contaminants to the interior of the enclosure means.

The bag 132 is formed from a heat-sealable plastic material such as vinyl or polyurethane and the bag-like enclosure member 122 is also formed from a heat sealable material which may be the same material as the bag 132 or any other desired material which is capable of being heat sealed to the bag material. It is to be noted that the bag 132 further comprises a separator element 136 which is adhesively or otherwise secured within the bag and adjacent the seam 134. The separator element 136 completely traverses the bag and is formed from a material different from that of the bag and incapable of being heat sealed to the bag material. For example, if the bag 132 is formed from polyethylene, the separator strip 136 may be formed from vinyl.

When introducing an article such as the article 130 into the enclosure means in accordance with the method of the present invention, the bag 132 containing the article is inserted through the access port 120 as shown in FIG. 11 until the seam 134 of the bag substantially abuts the seam 128 of the bag-like closure element or severable membrane 122 as shown in FIG. 12. A heat sealing device 138 is mounted by suitable support means within the enclosure as shown in FIGS. 1 and 11–13 for sealing and severing the members 122 and 132 as shown in FIGS. 12 and 13. The heat sealing device 138 may be substantially identical to the device 100 described above. Thus the heat sealing device 138 comprises a heating bar 140 having a resistance wire 142 across the top thereof and a pressure and heat absorbing bar 144 having a liquid filled flexible tube 146 traversing the lower side thereof. The tube 146 is connected with a water bottle, not shown, identical to the bottle 116 described above and adapted to be shifted between elevated and lowered positions for increasing and decreasing the hydraulic pressure.

When the bag 132 has been properly positioned with respect to the member 122, the heating and clamping bars 142 and 144 of the heat sealing device are shifted from the opened position shown in FIG. 11 to the closed position shown in FIG. 12 so as to clamp opposite sides of the member 122 against opposite side of the bag 132. It is to be noted that the heat sealing device is applied so that it is in alignment with the separator element 136 in the bag 132. Thus upon application of heat and pressure, the opposite sides of the member 122 are pressed against and sealed to opposite sides of the bag 132 and at the same time the sides are separated from each other. As the result, small end portions of the members 122 and 132 are sealed together as at 148 and 150 and are removed from the main portions of the portions 122 and 132 which are sealed together as at 152 and 154 and shown in FIGS. 13–15. It is to be noted that the separator element 136 prevents the opposite sides of the bag 132 from being sealed to each other and thus enables the smal lend portions comprising the end seams 128 and 134 of the members 122 and 132 to be removed. As a result an opening 156 is provided through the member 122 and at the end of the bag 132 so as to permit the article 130 to be removed from the bag and advanced into the enclosure means as shown in FIG. 14. It will be appreciated that this process enables enclosure means to remain sealed at all times.

In order to permit successive articles to be brought into the enclosure means, a supply 158 of the bag-like or diaphragm members 122 is maintained within the enclosure means as shown in FIG. 5. Any suitable support surface may be provided within the enclosure means for supporting this supply. After an article has been introduced into the enclosure as shown in FIG. 14 the enclosure may be readied for the introduction of another article as shown in FIG. 15. More specifically, a second bag-like or diaphragm member 122a is positioned over the first member at 122 and is secured within the groove 90 and the flange 86 by another elastic band 160. Then the bag 132 with the severed member 122 sealed thereto is pulled outwardly from the port member as shown in broken liens in FIG. 15. At any time thereafter, the elastic band 160 may be shifted for cooperation with the groove 88 and the above-described process for introducing an article into the enclosure means may be repeated.

While the preferred embodiment of the present invention has been shown and described herein, it is obvious that many details may be changed without departing from the spirit and scope of the appended claims.

The invention is claimed as follows:

1. An isolator comprising enclosure means, means defining a port in said enclosure means, and bag means traversing said port and having an end portion sealed with respect to said port defining means, said bag means closing and sealing said port, and said bag means having a sealable and severable intermediate portion for permitting an article to be transferred through said port while continuously sealing the interior of said enclosure means, wherein said bag means comprises a first portion extending inwardly from said port and a second initially sealed portion containing an article to be transferred through the port and into the enclosure means, said second sealed portion having an end positionable against said first portion, contacting areas of said first and second portions comprising said sealable and severable intermediate portion for enabling said second portion to be sealed to said first portion while severing first and second portions for for opening the interior of said second portion to the interior of the enclosure means.

2. An isolator, as defined in claim 1, wherein said first bag means portion is formed from heat sealable plastic material and said second bag means portion is formed from a heat sealable plastic material which is sealable to said first mentioned plastic material, said second bag means portion including means between opposite sides thereof for preventing sealing of said opposite sides of the second bag means portion to each other when the second bag means portion is positioned against and sealed to said first bag means portion.

3. An isolator, as defined in claim 1, wherein said means defining said port comprises an axially projecting flange extending inwardly with respect to said port, said first bag means portion including an end encircling said flange, said isolator comprising means releasably securing said end to said flange, and said isolator comprising a plurality of said first bag means portions located within said enclosure means and successively positionable over said flange and over a previously used first bag means portion for adapting said isolator for successively receiving a plurality of articles into the interior thereof.

4. An isolator comprising enclosure means, means defining a port in said enclosure means, and bag means traversing said port and having an end portion sealed with respect to said port defining means, said bag means closing and sealing said port, and said bag means having a sealable and severable intermediate portion for permitting an article to be transferred through said port while continuously sealing the interior of said enclosure means, wherein said sealable and severable intermediate bag means portion is formed from heat sealable plastic material, said isolator comprising an elongated heating element traversing one side of said intermediate bag means portion and a pressure applying element traversing an opposite side of said intermediate bag means portion and opposing said heating element, said heating and pressure applying elements being relatively shiftable between both the open and closed positions for clamping and sealing and severing said intermediate bag means portion therebetween, said pressure applying element comprising a flexible liquid containing tube, and a container of liquid connected with said tube and shiftable between elevated and lowered positions for adjusting hydraulic pressure within said tube.

5. An a method of transferring an article through an opening through an enclosure, the steps comprising closing and sealing said opening with heat sealable plastic material means defining a space exteriorly of the enclosure and adapted to contain an article to be transferred between said space and the interior of the enclosure, establishing communication between said space and the interior of said enclosure, and simultaneously heat sealing and severing an intermediate portion of said sheet material means between said space and the interior of said enclosure.

6. In a method of removing an article from an enclosure through an opening in the enclosure, the steps comprising closing said opening with a bag-like member having an interior communicating with said opening, moving the article from the interior of the enclosure through said opening and into the interior of said bag-like element, and thereafter simultaneously sealing and severing an intermediate portion of the bag-like element between said article and said opening for effecting completion of the removal of the article from the enclosure while continuously maintaining said opening in a sealed condition.

7. A method, as defined in claim 6, wherein said bag element is severed along a predetermined line and sealed along opposite sides of said line for maintaining the article in a sealed package upon completion of the severing operation.

8. A method of introducing an article into an enclosure through an opening in an enclosure while preventing contamination of the article or the enclosure comprising closing said opening with a severable and sealable sheet material member, enclosing an uncontaminated article in a package having a severable and sealable sheet material end portion, positioning said end portion against sheet material member, and simultaneously forming seals between opposite sides of said end portion and said sheet material member and thereafter severing said sheet material member and said end portion inwardly of seals for opening the interior of said package to the interior of said enclosure.

9. A method, as defined in claim 8, wherein said sheet material member and said sheet material end portion of the package are formed of heat sealable plastic material, and said steps of sealing and severing are accomplished simultaneously by the application of heat and pressure.

10. In a method of making sanitary transfer of a series of articles between a position interior of a closed chamber having a transfer port therein and a position exterior of said chamber, the steps comprising closing and sealing said port with first heat sealable plastic material means sized to define a space for receiving an article to be transferred, introducing a first article into said space from one of said positions, simultaneously forming an endless heat seal and an adjacent endless severed edge in said first heat sealable plastic material means in continuation of closing and sealing said port, effecting transfer of said first article to the other of said positions, closing and sealing said port with second heat sealable plastic material means in continuation of said first material means closing and sealing said port, removing said first material means from said port, introducing a second article, into the space defined by said second plastic material means from said one position, simultaneously forming an endless heat seal and an adjacent endless severed edge in said second plastic material means in continuation of closing and sealing said port, and effecting transfer of said second article to said other position.

References Cited

UNITED STATES PATENTS

| | | | |
|---|---|---|---|
| 2,786,740 | 3/1957 | Taylor et al. | 312—1 |
| 3,051,164 | 8/1962 | Trexler | 312—1 |
| 3,084,684 | 4/1963 | Saunders | 312—1 |

DAVID J. WILLIAMOWSKY, *Primary Examiner.*

J. L. KOHNEN, *Assistant Examiner.*